(12) United States Patent
Garner

(10) Patent No.: US 7,762,579 B2
(45) Date of Patent: Jul. 27, 2010

(54) EJECTION MITIGATION DEVICE

(75) Inventor: Brett Garner, South Weber, UT (US)

(73) Assignee: Autoliv ASP, Inc., Ogden, UT (US)

( * ) Notice: Subject to any disclaimer, the term of this patent is extended or adjusted under 35 U.S.C. 154(b) by 332 days.

(21) Appl. No.: 11/731,980

(22) Filed: Apr. 2, 2007

(65) Prior Publication Data

US 2008/0238045 A1 Oct. 2, 2008

(51) Int. Cl.
*B60R 21/213* (2006.01)
(52) U.S. Cl. .................................................. 280/730.2
(58) Field of Classification Search .............. 280/728.2, 280/727, 730.1, 730.2, 743.1, 749
See application file for complete search history.

(56) References Cited

U.S. PATENT DOCUMENTS

| | | | | |
|---|---|---|---|---|
| 2,834,606 | A * | 5/1958 | Bertrand | ................. 280/730.1 |
| 3,804,435 | A * | 4/1974 | See et al. | ..................... 280/733 |
| 4,657,105 | A | 4/1987 | Miyada | |
| 4,906,020 | A | 3/1990 | Haberer | |
| 5,470,103 | A * | 11/1995 | Vaillancourt et al. | ..... 280/730.1 |
| 5,588,672 | A | 12/1996 | Karlow et al. | |
| 5,707,075 | A | 1/1998 | Kraft et al. | |
| 5,988,735 | A * | 11/1999 | Muller | ....................... 296/214 |
| 6,237,938 | B1 | 5/2001 | Boxey | |
| 6,312,009 | B1 | 11/2001 | Håland et al. | |
| 6,474,681 | B2 | 11/2002 | Peer et al. | |
| 6,502,854 | B2 * | 1/2003 | Mueller | .................... 280/730.1 |
| 7,083,188 | B2 * | 8/2006 | Henderson et al. | ........ 280/730.2 |
| 7,165,783 | B2 | 1/2007 | Karlbauer et al. | |
| 2004/0066022 | A1 | 4/2004 | Mori et al. | |
| 2004/0232665 | A1 | 11/2004 | Bendig et al. | ............ 280/730.2 |
| 2005/0082797 | A1 | 4/2005 | Welford et al. | |
| 2006/0097491 | A1 | 5/2006 | Saberan et al. | |
| 2006/0138754 | A1 * | 6/2006 | Hirata et al. | ............. 280/730.1 |
| 2006/0175814 | A1 | 8/2006 | Jang et al. | |
| 2006/0214401 | A1 * | 9/2006 | Hirata | ..................... 280/730.1 |
| 2007/0045999 | A1 * | 3/2007 | Saberan et al. | ........... 280/730.2 |

(Continued)

FOREIGN PATENT DOCUMENTS

DE 198 41 347 3/2000

(Continued)

OTHER PUBLICATIONS

Notification of Transmittal of the International Search Report and the Written Opinion of the International Searching Authority issued Aug. 1, 2008 in International Application No. PCT/US2008/052876.

(Continued)

*Primary Examiner*—Paul N Dickson
*Assistant Examiner*—Robert A Coker
(74) *Attorney, Agent, or Firm*—Sally J Brown; Stoel Rives, LLP

(57) ABSTRACT

An airbag system for protecting a passenger in a motor vehicle including one or more ejection mitigation devices configured to substantially cover the inside of the front and/or rear window of the motor vehicle. Moreover, the one or more ejection mitigation devices may be attached to a driver's side inflatable airbag and a passenger's side inflatable airbag, wherein the ejection mitigation device is configured to be deployed by the inflation of the driver's and passenger's side inflatable airbags.

21 Claims, 5 Drawing Sheets

U.S. PATENT DOCUMENTS

2007/0046001 A1 * 3/2007 Hirata ................ 280/730.2
2008/0238045 A1 10/2008 Garner

FOREIGN PATENT DOCUMENTS

| DE | 101 15 064 A1 | 11/2002 |
| --- | --- | --- |
| EP | 1 264 742 | 2/2005 |
| EP | 1 634 778 | 3/2006 |
| EP | 1 676 758 | 7/2006 |

OTHER PUBLICATIONS

Office Action issued May 1, 2009 in co-pending U.S. Appl. No. 11/850,426.
Amendment and Response to Office Action filed Nov. 2, 2009 in co-pending U.S. Appl. No. 11/850,426.

* cited by examiner

EJECTION MITIGATION DEVICE

TECHNICAL FIELD

The present disclosure relates generally to the field of motor vehicle occupant protective systems. More specifically, the present disclosure relates to ejection mitigation devices for passenger airbag systems.

BRIEF DESCRIPTION OF THE DRAWINGS

Understanding that drawings depict only typical embodiments of the invention and are not therefore to be considered to be limiting of its scope, the invention will be described and explained with specificity and detail through the use of the accompanying drawings as listed below.

Figure 1:
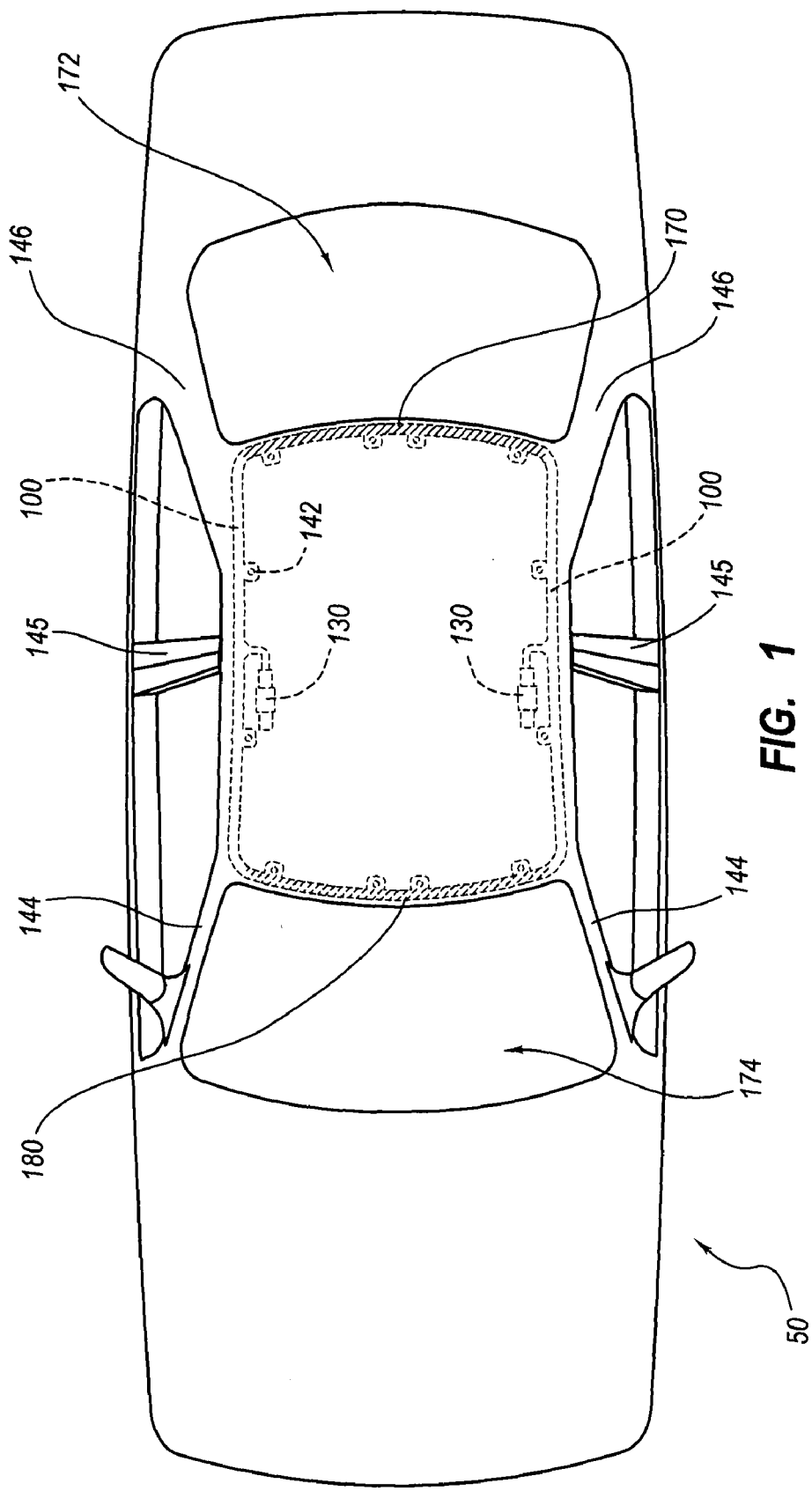
FIG. 1 is a top view of a motor vehicle with an automobile airbag and an ejection mitigation device mounted in the vehicle in the undeployed state.

INDEX OF ELEMENTS IDENTIFIED IN THE DRAWINGS 50 vehicle
50' vehicle
100 inflatable airbag
130 generator
142 attachment clips
144 A-pillar
145 B-pillar
146 C-Pillar
170 rear ejection mitigation device
172 rear window
174 front window
180 front ejection mitigation device
300 inflatable airbag
310 tether
312 tether
330 generator
342 attachment clips
344 attachment point
370 rear ejection mitigation device
380 front ejection mitigation device
400 side curtain airbag
405 inflatable zone
470 rear ejection mitigation device
500 passenger's side curtain airbag
501 driver's side curtain airbag
570 rear ejection mitigation device
571 rear ejection mitigation device
575 attachment means
580 inflatable chamber
580 inflatable chamber

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the invention, as claimed, but is merely representative of various embodiments. While the various aspects of the embodiments are presented in the drawings, the drawings are not necessarily drawn to scale unless specifically indicated.

As those of skill in the art will appreciate, the principles of the invention may be applied to and used with a variety of airbag deployment systems including frontal driver and passenger airbags, knee airbags, overhead airbags, curtain airbags, and the like. Thus, the present invention is applicable to airbag cushions of various shapes and sizes.

Referring to FIG. 1, an airbag system for protecting a passenger in a motor vehicle may include at least one inflatable airbag 100, shown in an undeployed state disposed within a motor vehicle 50. The inflatable airbag 100 may be mounted on or near a roof rail inside the vehicle 50. The inflatable airbag 100 may also include an inflator 130 that may contain a stored quantity of pressurized inflation fluid or a combination of pressurized inflation fluid and ignitable material for heating the inflation fluid. Alternatively, the inflator 130 may be a pyrotechnic inflator that uses the combustion of gas-generating material to generate the inflation gas.

The inflatable airbag 100 may be mounted to the vehicle 50 by attachment clips 142. The inflatable airbag 100 may extend from the A-pillar 144 to the B-pillar 145 in the vehicle 100. In another example, the inflatable airbag 100 may extent from the A-pillar the C-pillar 146 in the vehicle 100. In alternative embodiments, the inflatable airbag 100 may extend from the A-pillar 144 to a D-pillar in larger A-D vehicles such as vans and large sport utility vehicles.

With continued reference to FIG. 1, the inflatable airbag 100 may also be associated with one or more ejection mitigation devices such as a rear ejection mitigation device 170 ("REMD 170") and a front mitigation device 180 ("FEMD 180"). The ejection mitigation devices may be non-inflatable or be inflatable or partially inflatable. For example, the REMD 170 and/or the FEMD 180 may include one or more air chambers in fluid communication with the inflatable airbag 100. In one example, the REMD 170 may be attached to one or more locations on the rear edge of the passenger's and driver's side airbags 100. The REMD 170 may be non-inflatable and may be formed from a mesh, a net, a flat fabric, or other appropriate material. In the undeployed state, the REMD 170 may be mounted and stored in the roof rail of the motor vehicle 50.

Figure 2:
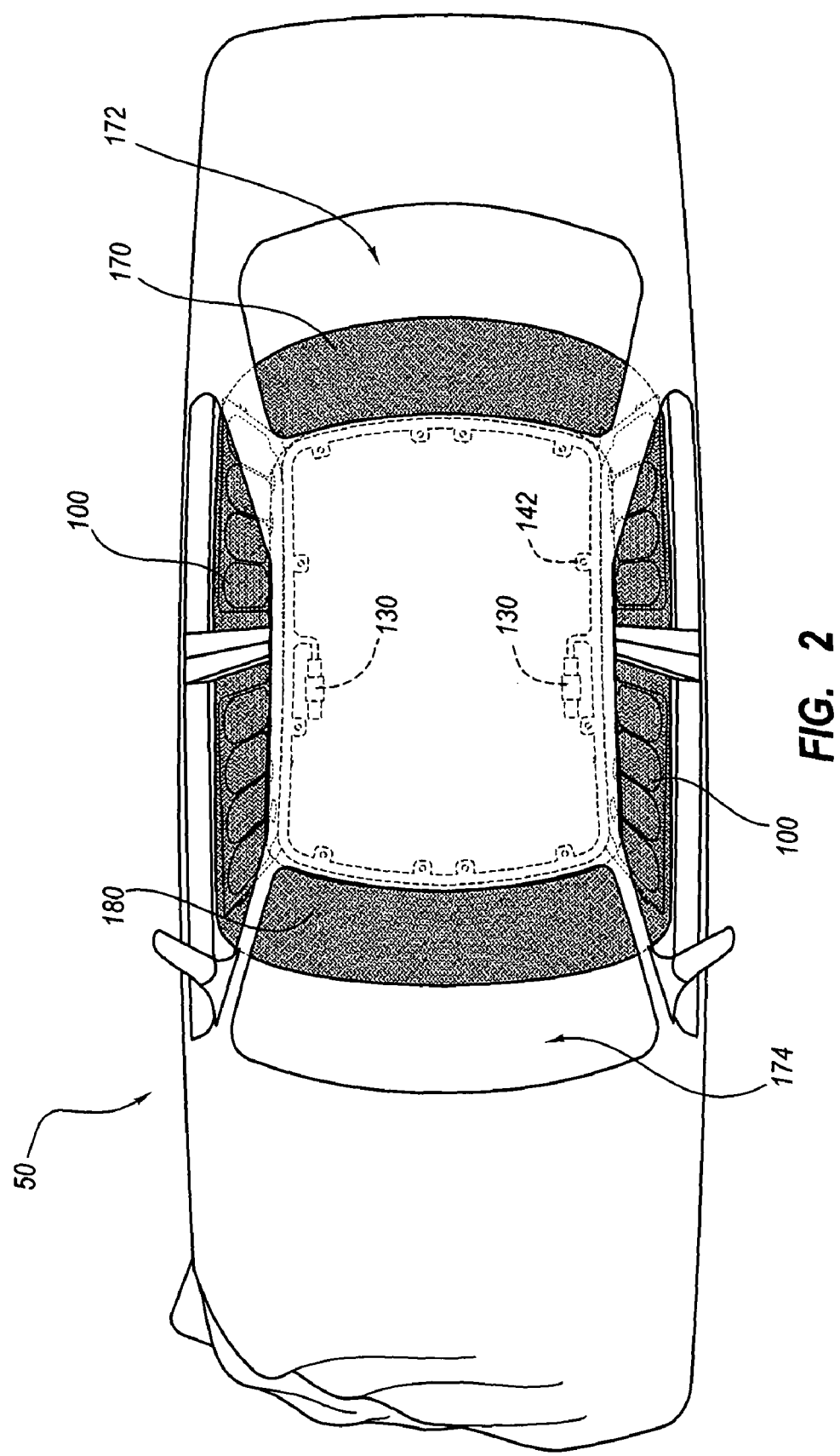
FIG. 2 is a top view of the motor vehicle shown in FIG. 1 with the automobile airbag and the ejection mitigation device in the deployed state.

As shown in FIG. 2, when the passenger's and driver's side airbags 100 are deployed the REMD 170 is deployed across the inside of the rear window 172 of the motor vehicle 50. For example, REMD 170 may extend from the roof rail or vehicle ceiling down to the top of the rear passenger seats or down to the rear deck of the vehicle 50. The REMD 170 may be attached directly to the vehicle 50 at one or more locations, such as attached to a roof rail or the ceiling of the vehicle 50 at attachment point 344. In this way, the REMD 170 may cover the rear window 172 and may prevent passenger ejection in a collision or rollover. Furthermore, because the REMD 170 is attached to the rear edge of the passenger's and driver's side airbags 100, the REMD 170 ties the passenger's and driver's side airbags together; thus, preventing the passenger's and driver's side airbags 100 from swinging outside the motor vehicle 50 or from being pushed outside by the impact of a passenger.

In yet another embodiment, the REMD 170 together with the FEMD 180 may be attached to the passenger's and driver's side airbags 100 as shown in FIG. 2. The FEMD 180 is preferably non-inflatable and may be formed of a mesh, net, or other material. The FEMD 180 may be configured to extend from the roof rail or vehicle ceiling down to the vehicle instrument panel or to the surface of the vehicle dashboard. The FEMD 180 may be attached directly to the vehicle 50, such as being attached to the roof rail or the ceiling of the vehicle 50. In this way, the FEMD 180 may cover the inside of the front window 174 of the vehicle 50. The simultaneous use of both the REMD 170 and the FEMD 180 may provide ejection mitigation protection for the front window 174 as well as the rear window 172. Furthermore, the attachment of both the FEMD 180 and the REMD 170 to the front and rear edges of the passenger's and driver's side airbags 100, will act to stabilize the deployed airbags and prevent them from swinging outside of the motor vehicle during a collision or rollover accident.

In yet another example (not shown), the FEMD 180 may be attached to the passenger's and driver's side airbags 100 without any accompanying REMD 170. In this way, when the passenger's and driver's side airbags 100 are deployed the FEMD 180 is also deployed to prevent ejection of a passenger from the front window 174 of the vehicle 50. The FEMD 180 may be configured to be deployed concurrently with or independently from the inflation of the vehicle's front airbags (not shown). For example, the FEMD 180 may be configured to deploy between the front window 174 and the inflated front airbags of vehicle 50 thus providing for the impact protection of the front airbags as well as the ejection mitigation protection from the FEMD 180.

Figure 3:
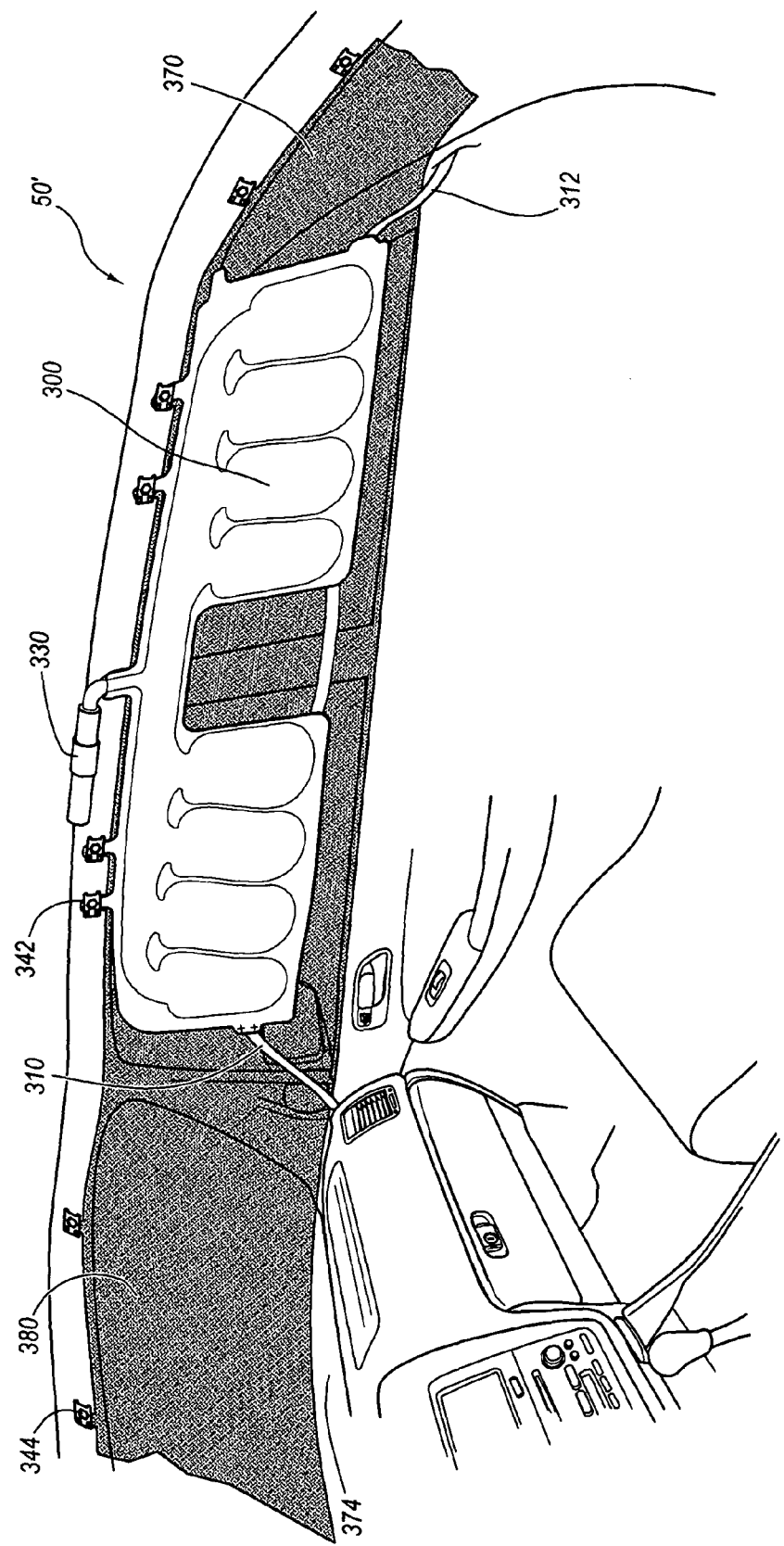
FIG. 3 is a view inside a motor vehicle with an automobile airbag and an ejection mitigation device in a deployed state.

In yet another embodiment shown in FIG. 3, the passenger's and driver's inflatable airbags 300 may be mounted to the motor vehicle 50' by attachment clips 342 and stored in the undeployed state at the roof rail of the motor vehicle 50'. The inflatable airbag 300 may be deployed by the generator 330 and tethered to the vehicle by tethers 310 and 312. Attached to the inflatable airbag 300 may be a front ejection mitigation device 380 ("FEMD 380") attached at one or more location to the inflatable airbag 300. FIG. 3 shows how the passenger's side inflatable airbag 300 and the attached FEMD 380 may be deployed across the side and front windows of the vehicle 50'. The FEMD 380 may extend from the front window 374 and wrap around the inside of the vehicle adjacent to the A-pillar of the vehicle 50'. The FEMD 380 may be attached at one or more locations on the inflatable airbag 300. For example, the FEMD 380 may be attached to the top and bottom of the front edge of the inflatable airbag 300. In one example, the FEMD 380 may be attached to the inflatable airbag 300 at the same location where tether 310 is attached. In yet another example, the FEMD 380 may be integral to the inflatable airbag 300 such that the mesh, net or other material of the FEMD 380 is continuous with the inflatable airbag 300 or the mesh, net or other material that may be surrounding and supporting the inflatable airbag 300. In another embodiment, a rear ejection mitigation device 370 ("REMD 370") may be deployed across the rear windows of the vehicle 50' and may be integral with the inflatable airbag 300 and/or attached to the inflatable airbag 300 at the same location where tether 312 is attached.

Figure 4:
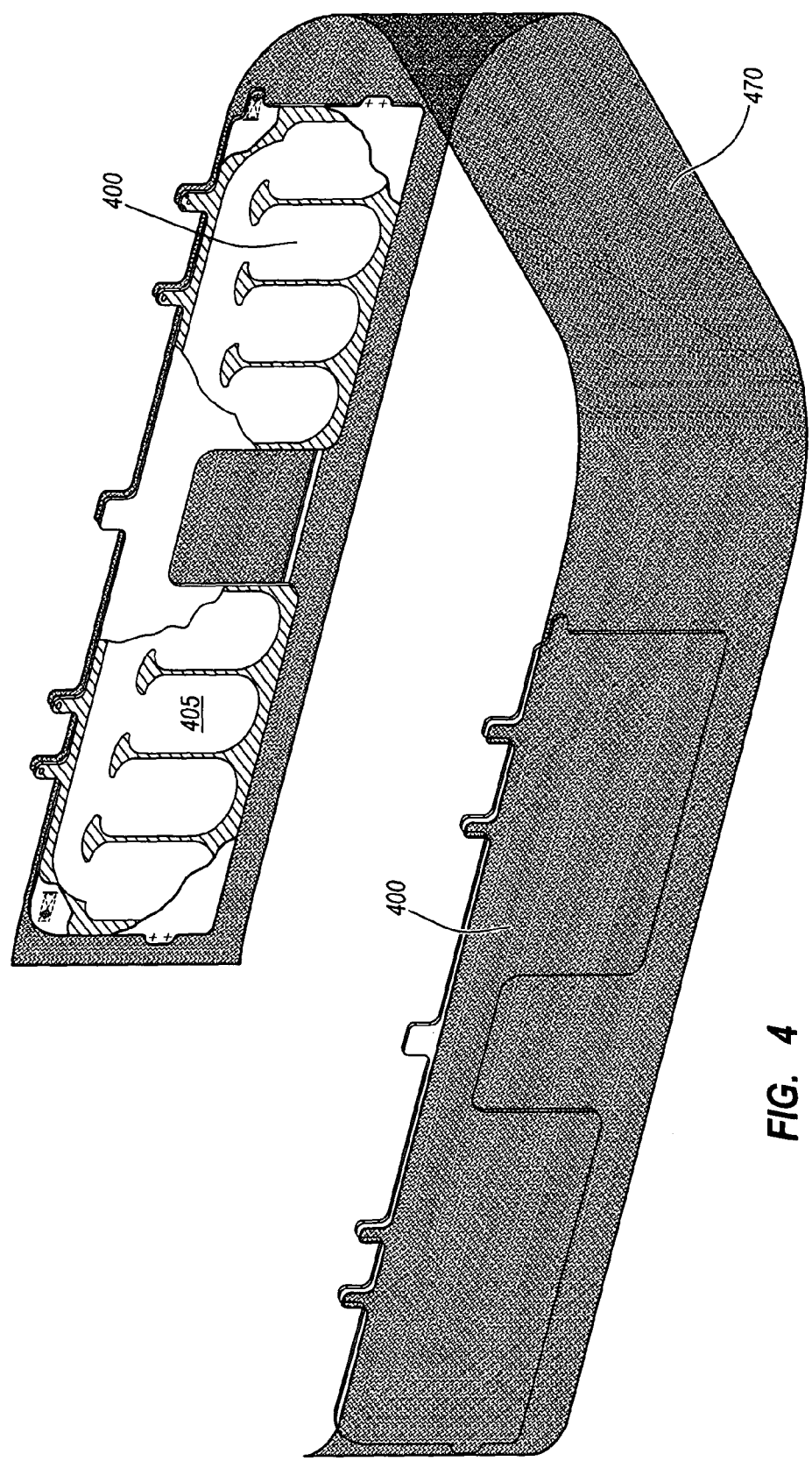
FIG. 4 is a perspective view of an automobile airbag and an ejection mitigation device.

FIG. 4 shows a deployed driver's and passenger's inflatable side curtain airbag 400. The side curtain airbag 400 includes a mesh, net, or other fabric that surrounds the inflatable portion 405. The side curtain airbag 400 and the surrounding mesh, net, or other fabric may be integral with a rear ejection mitigation device 470 (REMD 470). The REMD 470 may be integral with both the passenger's and the driver's inflatable side curtain airbag 400. In yet another example shown by FIG. 5, a passenger's side curtain airbag 500 may be attached to a first one or more rear ejection mitigation device 570 ("REMD 570"). In another embodiment, the passenger's side curtain airbag 500 may be attached to a first one or more front ejection devices either alone or in combination with the REMD 570.

Figure 5:
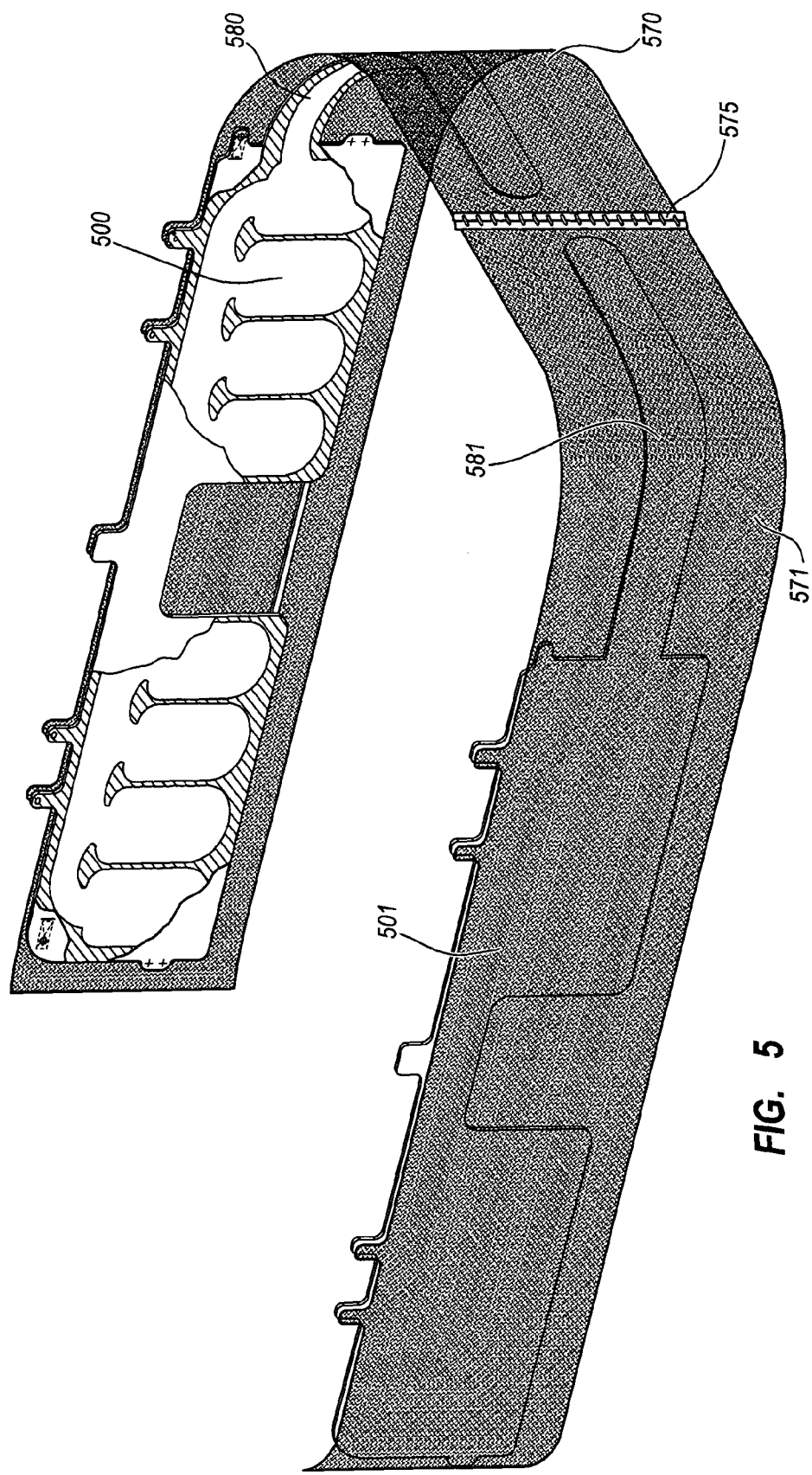
FIG. 5 is a perspective view of an automobile airbag and an ejection mitigation device

With continued reference to FIG. 5, a driver's side curtain airbag 501 may be attached to a second one or more REMD 571. In another embodiment, not shown, the driver's side curtain airbag 501 may be attached to a second one or more front ejection devices either alone or in combination with the one or more second REMD 571. The one or more first REMD 570 may be configured to attach to the second one or more REMD 571 with attachment means 575 including hooks, tape, hook-and-loop closures, or other means. In this way, a driver's side airbag module and a passenger's side airbag module, including their respective ejection mitigation devices, may be mounted individually and then attached by connecting the front and/or rear ejection mitigation devices by using the attachment means 575.

In another example, an ejection mitigation device may include an inflatable chamber that may be at least partially inflated by the inflation gasses from the main chambers of the passenger and driver side airbags. As shown in FIG. 5, the one or more REMD 570 may include an inflatable chamber 580 that is fluid communication with the passenger's side airbag 500. Similarly, the one or more REMD 571 may include an inflatable chamber 581 that is in fluid communication with the driver's side airbag 501.

Referring to FIG. 4, in yet another embodiment the REMD 470 may be part of a continuous ejection mitigation structure that may extend from the A-pillar on one side of the vehicle and extend down the side of vehicle and wrap around the rear window and extend forward along the opposite side of the vehicle toward the other A-pillar. In this way, the passenger's and driver's inflatable side airbag 400 and the attached REMD 470 may cover the side and rear windows of the vehicle to prevent the ejection of a passenger during a collision or rollover accident.

Furthermore, because the REMD 470 is attached to the rear edge of the passenger and driver's inflatable side airbags 400, the REMD 470 serves to connect the passenger's and driver's side airbags together; thus, preventing the passenger's and driver's inflatable side airbags 400 from swinging outside a motor vehicle or from being pushed outside the vehicle by the impact of a passenger.

In yet another example, the passenger's and driver's inflatable side airbag 400 may be attached to the REMD 470 as well as a front ejection mitigation device or panel (not shown) configured to be deployed with the inflatable side airbags 400 and to cover the front window. As such, the REMD 470 and the front ejection mitigation device or panel will help prevent passenger ejection from both the front and rear windows of the vehicle.

Various embodiments for preventing the ejection of a passenger from a vehicle have been disclosed herein. The front and rear ejection mitigation devices, alone or in combination, are examples of means for ejection mitigation and keeping a passenger's limbs, head, and body within the vehicle.

Without further elaboration, it is believed that one skilled in the art can use the preceding description to utilize the present disclosure to its fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the invention is therefore defined by the following claims.

The invention claimed is:

1. An airbag system for protecting a passenger in a motor vehicle, the airbag system comprising:
   at least one driver's side inflatable airbag;
   at least one passenger's side inflatable airbag;
   at least one rear ejection mitigation device configured to substantially cover a rear window of the motor vehicle, wherein the at least one rear ejection mitigation device is non-inflatable,
      wherein the at least one rear ejection mitigation device is directly attached to both the at least one driver's side inflatable airbag and the at least one passenger's side inflatable airbag; and
      wherein the at least one rear ejection mitigation device is configured to be deployed only by movement of the at least one driver's side inflatable airbag and the at least one passenger's side inflatable airbag due to inflation of the at least one driver's side inflatable airbag and the at least one passenger's side inflatable airbag.

2. The airbag system of claim 1, wherein the at least one rear ejection mitigation device comprises at least one of a mesh, a net or a flat fabric.

3. The airbag system of claim 1, wherein the at least one rear ejection mitigation device extends along the at least one driver's side inflatable airbag and extends along the at least one passenger's side inflatable airbag.

4. The airbag system of claim 1, wherein the at least one rear ejection mitigation device is integral to both the at least one driver's side inflatable airbag and the at least one passenger's side inflatable airbag.

5. The airbag system of claim 1, wherein the at least one rear ejection mitigation device is attached to the motor vehicle.

6. The airbag system of claim 1, wherein the at least one front ejection mitigation device comprises at least one of a mesh, a net or a flat fabric.

7. An airbag system for protecting a passenger in a motor vehicle, the airbag system comprising:
   at least one driver's side inflatable airbag;
   at least one passenger's side inflatable airbag;
   at least one front ejection mitigation device configured to substantially cover a front window of the motor vehicle, wherein the at least one front ejection mitigation device is non-inflatable,
      wherein the at least one front ejection mitigation device is directly attached to both the at least one driver's side inflatable airbag and the at least one passenger's side inflatable airbag; and
      wherein the at least one front ejection mitigation device is configured to be deployed only by movement of the at least one driver's side inflatable airbag and the at least one passenger's side inflatable airbag due to inflation of the at least one driver's side inflatable airbag and the at least one passenger's side inflatable airbag.

8. The airbag system of claim 7, wherein the at least one front ejection mitigation device extends along the at least one driver's side inflatable airbag and extends along the at least one passenger's side inflatable airbag.

9. The airbag system of claim 7, wherein the at least one front ejection mitigation device is integral to both the at least one driver's side inflatable airbag and the at least one passenger's side inflatable airbag.

10. The airbag system of claim 7, wherein the at least one front ejection mitigation device is attached to the motor vehicle.

11. An airbag system for protecting a passenger in a motor vehicle, the airbag system comprising:
    at least one driver's side inflatable airbag;
    at least one passenger's side inflatable airbag;
    at least one front ejection mitigation device attached to both the at least one driver's side inflatable airbag and the at least one passenger's side inflatable airbag; wherein the at least one front ejection mitigation device is configured to substantially cover a front window of the motor vehicle;
    at least one rear ejection mitigation device directly attached to both the at least one driver's side inflatable airbag and the at least one passenger's side inflatable airbag; wherein the at least one rear ejection mitigation device is configured to substantially cover a rear window of the motor vehicle; and
       wherein the at least one front ejection mitigation device and the at least one rear ejection mitigation device are both non-inflatable;
       wherein the at least one front ejection mitigation device and the at least one rear ejection mitigation device are configured to be deployed only by movement of the at least one driver's side inflatable airbag and the at least one passenger's side inflatable airbag due to inflation of the at least one driver's side inflatable airbag and the at least one passenger's side inflatable airbag.

12. The airbag system of claim 11, wherein the at least one front ejection mitigation device and the at least one rear ejection mitigation device extend towards each other along the at least one driver's side inflatable airbag and the at least one passenger's side inflatable airbag.

13. The airbag system of claim 11, wherein both the at least one front ejection mitigation device and the at least one rear ejection mitigation device are integral to both the at least one driver's side inflatable airbag and the at least one passenger's side inflatable airbag; and
    wherein both the at least one front ejection mitigation device and the at least one rear ejection mitigation device are configured to be deployed simultaneously by the inflation of the at least one driver's side inflatable airbag and the at least one passenger's side inflatable airbag.

14. The airbag system of claim 11, wherein the at least one front ejection mitigation device comprises at least one of a mesh, a net or a flat fabric.

15. The airbag system of claim 11, wherein the at least one rear ejection mitigation device comprises at least one of a mesh, a net or a flat fabric.

16. The airbag system of claim 11, wherein the at least one rear ejection mitigation device is attached to the motor vehicle.

17. The airbag system of claim 11, wherein the at least one front ejection mitigation device is attached to the motor vehicle.

18. The airbag system of claim 11, wherein the at least one front ejection mitigation device is attached to the at least one driver's side inflatable airbag and to the at least one passenger's side inflatable airbag; and wherein the at least one rear ejection mitigation device is attached to the at least one driver's side inflatable airbag and to the at least one passenger's side inflatable airbag.

19. The airbag system of claim 11, wherein the at least one driver's side inflatable airbag is attached to a first front ejection mitigation device and a first rear ejection mitigation device;

wherein the at least one passenger's side inflatable airbag is attached to a second front ejection mitigation device and a second rear ejection mitigation device;

wherein the first front ejection mitigation device is configured to attach to the second front ejection mitigation device; and wherein the first rear ejection mitigation device is configured to attach to the second rear ejection mitigation device.

20. The airbag system of claim 19, wherein the first front ejection mitigation device is attached to the second front ejection mitigation device with attachment means selected from the group consisting of hooks, tape, hook-and-loop closure, or combinations thereof.

21. The airbag system of claim 19, wherein the first rear ejection mitigation device is attached to the second rear ejection mitigation device with attachment means selected from the group consisting of hooks, tape, hook-and-loop closure, or combinations thereof.

* * * * *